United States Patent
Negulescu et al.

(10) Patent No.: US 10,100,643 B2
(45) Date of Patent: Oct. 16, 2018

(54) VIBRATION DAMPER

(71) Applicant: ROLLS-ROYCE DEUTSCHLAND LTD & CO KG, Blankenfelde-Mahlow, Dahlewitz (DE)

(72) Inventors: Ioana Negulescu, Berlin (DE); Peter Davison, Zossen (DE)

(73) Assignee: ROLLS-ROYCE DEUTSCHLAND LTD & CO KG, Dahleqitz (DE)

( * ) Notice: Subject to any disclaimer, the term of this patent is extended or adjusted under 35 U.S.C. 154(b) by 408 days.

(21) Appl. No.: 14/551,786

(22) Filed: Nov. 24, 2014

(65) Prior Publication Data
US 2016/0177727 A1 Jun. 23, 2016

(30) Foreign Application Priority Data

Dec. 20, 2013 (GB) .................................. 1322668.3

(51) Int. Cl.
*F01D 5/10* (2006.01)
*F01D 5/08* (2006.01)
(Continued)

(52) U.S. Cl.
CPC .............. *F01D 5/08* (2013.01); *F01D 5/082* (2013.01); *F01D 5/26* (2013.01); *F01D 11/008* (2013.01);
(Continued)

(58) Field of Classification Search
CPC ... F01D 5/08; F01D 5/082; F01D 5/26; F01D 11/008; F01D 5/081; F01D 5/085;
(Continued)

(56) References Cited

U.S. PATENT DOCUMENTS 3,266,770 A * 8/1966 Harlow .................. F01D 5/081
416/174
3,266,771 A * 8/1966 Morley ..................... F01D 5/22
416/190
(Continued)

FOREIGN PATENT DOCUMENTS

EP 1 452 694 A2 9/2004
FR 2 970 033 A1 7/2012
(Continued)

OTHER PUBLICATIONS

Jun. 1, 2015 Search Report issued in European Patent Application No. 14 19 4528.
(Continued)

*Primary Examiner* — Kenneth Bomberg
*Assistant Examiner* — Brian DelRue
(74) *Attorney, Agent, or Firm* — Oliff PLC

(57) ABSTRACT

A gas turbine engine including a rotor and a cooling fluid delivery system is presented. The rotor includes a disc and a plurality of blades extending radially therefrom. Each blade has a suction side and a pressure side and includes a shank, a platform and a main portion, the main portion being radially outward of the shank and separated therefrom by the platform. At least one cavity is defined, each radially inward of the platforms and between a suction side of the shank of one blade and a pressure side of the shank of an adjacent blade. The rotor includes at least one damper, the damper including a main body in contact with at least one blade and a deflector nose. The deflector nose extends from the main body into the cavity.

9 Claims, 2 Drawing Sheets

(51) Int. Cl.
    *F01D 5/26*     (2006.01)
    *F01D 11/00*     (2006.01)
    *F16F 15/10*     (2006.01)

(52) U.S. Cl.
    CPC .......... *F16F 15/10* (2013.01); *F05D 2260/95* (2013.01); *F05D 2260/96* (2013.01)

(58) Field of Classification Search
    CPC ... F01D 5/148; F01D 5/16; F01D 5/20; F01D 5/141; F01D 5/18; F01D 5/147; F01D 11/24; F01D 5/188; F01D 11/005; F01D 11/006; F16F 15/10; F05D 2260/95; F05D 2260/96
    USPC .......................................................... 415/200
    See application file for complete search history.

(56) References Cited

U.S. PATENT DOCUMENTS

| | | | | |
|---|---|---|---|---|
| 3,689,176 | A * | 9/1972 | Howell | F01D 5/3015 416/219 R |
| 5,127,799 | A * | 7/1992 | Berry | F01D 11/005 277/648 |
| 5,513,955 | A * | 5/1996 | Barcza | F01D 11/006 416/193 A |
| 5,803,710 | A * | 9/1998 | Dietrich | F01D 5/22 416/248 |
| 5,820,348 | A * | 10/1998 | Fricke | F01D 5/027 188/268 |
| 6,402,471 | B1 * | 6/2002 | Demers | F01D 5/081 415/115 |
| 2003/0012654 | A1 | 1/2003 | Strassberger et al. | |
| 2008/0286106 | A1 | 11/2008 | Keith et al. | |
| 2013/0064668 | A1 * | 3/2013 | Paige, II | F01D 5/26 416/219 R |
| 2014/0119916 | A1 * | 5/2014 | Faulder | F01D 5/22 416/95 |
| 2014/0119917 | A1 * | 5/2014 | Tarczy | F01D 5/22 416/140 |
| 2014/0119918 | A1 * | 5/2014 | Tarczy | F01D 5/22 416/144 |
| 2014/0119943 | A1 * | 5/2014 | Tarczy | F01D 5/3069 416/96 R |

FOREIGN PATENT DOCUMENTS

| | | | |
|---|---|---|---|
| GB | 1014577 A * | 12/1965 | ............ F01D 5/081 |
| GB | 2 411 697 A | 9/2005 | |

OTHER PUBLICATIONS

Aug. 15, 2014 Search Report issued in GB Application No. 1322668.3.

* cited by examiner

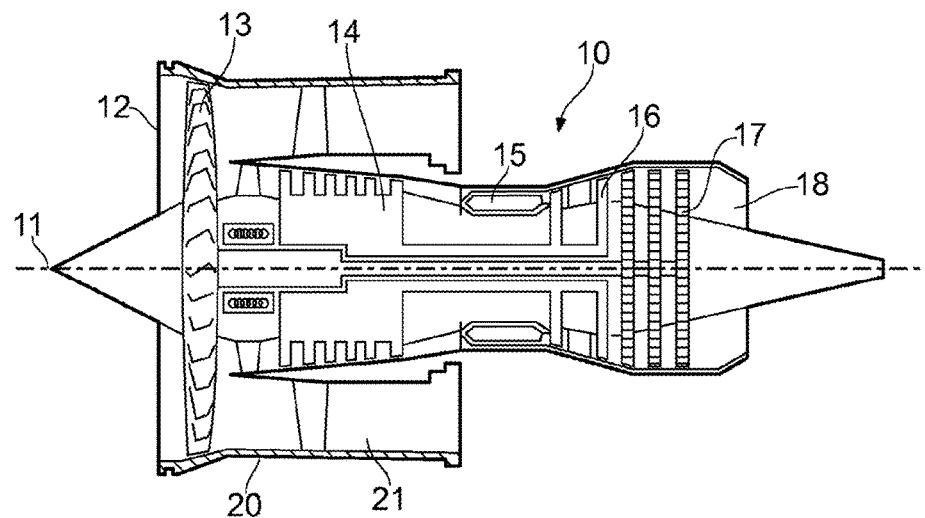
FIG. 1
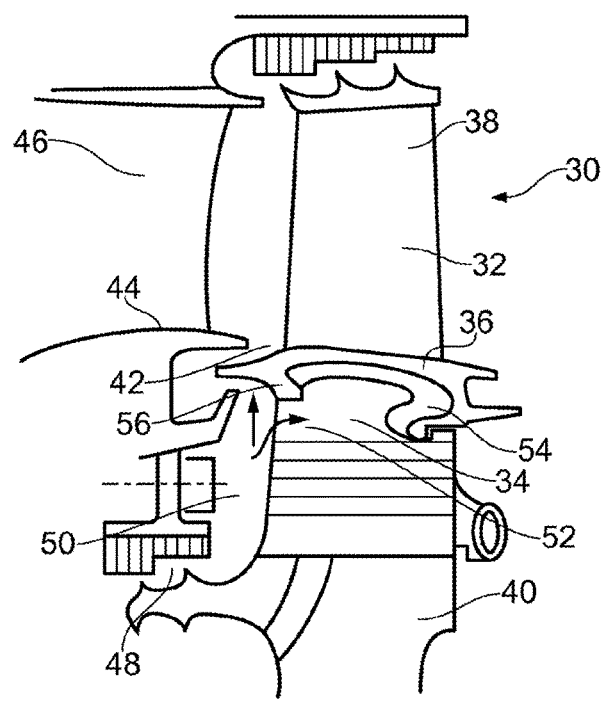
FIG. 2 - PRIOR ART

VIBRATION DAMPER

The present disclosure concerns prevention of damage to blades in rotors of gas turbines. The disclosure may more specifically concern a gas turbine engine, a rotor and a vibration damper.

In the field of gas turbines it is well known to deliver streams of fluid (typically bled from a compressor stage) to other parts of the gas turbine engine. This fluid may then be used for cooling components (the materials of which might otherwise be incapable of withstanding the temperatures to which they are exposed) and/or sealing (e.g. creating a pressure differential across a potential leakage path).

Taking a specific example, it is known to cool cavities located between adjacent blade shanks radially inward of their platforms with cooling fluid. The cooling fluid supplied typically enters a pre-chamber axially upstream of these cavities. From there a proportion of the fluid may be channelled radially outwards to seal a potential leakage path between the blade platforms and an annulus wall. The remainder of the fluid is however incident into the cavities, the stream into each cavity being substantially unidirectional. This unidirectional stream impinges on the cavity walls, and where it does so tends to cause a build-up of deposits and/or corrosion. The stream, while providing a useful function in cooling and ventilating the cavities, may be of significant detriment to the maintenance cycle times and longevity of the blades in view of the mentioned deposits.

Various solutions have been considered to this problem, including changes to the shape and/or composition of the cavity walls and changes to the architecture of the cooling fluid supply and/or the source of the cooling fluid. Generally however each of these options carries a penalty in terms of performance and/or manufacturing cost.

According to a first aspect of the invention there is provided a gas turbine engine comprising optionally a rotor and optionally a cooling fluid delivery system, the rotor comprising optionally a disc and optionally a plurality of blades extending radially therefrom, each blade having optionally a suction side and optionally a pressure side and comprising optionally a shank, optionally a platform and optionally a main portion, the main portion being optionally radially outward of the shank and optionally separated therefrom by the platform, and where optionally at least one cavity is defined, each optionally radially inward of the platforms and optionally between a suction side of the shank of one blade and a pressure side of the shank of an adjacent blade, and where further the rotor optionally comprises at least one damper, the damper comprising optionally a main body optionally in contact with at least one blade and optionally a deflector nose, the deflector nose optionally extending from the main body into the cavity, and optionally arranged so that in use it deflects a stream of cooling fluid incident into the cavity delivered by the cooling fluid delivery system, away from the suction side of the shank partially defining the cavity.

The suction side of the shank may be particularly vulnerable to corrosion as a result of direct impingement by the cooling fluid stream thereon. The suction side may also be particularly vulnerable to the build-up of deposits found in the cooling fluid stream. The use of the damper with the deflector nose may however prevent direct impingement of a cooling fluid stream on parts or all of the suction side, limiting or preventing damage and/or build-ups. Modification of the relatively inexpensive damper to provide the deflector nose may provide a cost-effective method of dealing with this issue.

For simplicity and clarity features such as dampers, cavities and blades tend to be discussed in the singular throughout this document. Nonetheless it will be appreciated that multiple examples of such features (including their sub-features) may be beneficially comprised in a single rotor.

In some embodiments the cooling fluid delivery system is arranged to deliver the cooling fluid incident into the cavity in a substantially axial direction. Thus it may be that the cooling fluid is delivered from in front of the cavity rather than, for instance, from radially inward of it. Consequently the cooling fluid incident on the suctions side of the shank may be incident from an axial direction.

In some embodiments the longitudinal axis of the main body of the damper is parallel to a wedge face of the platform with which it is in contact. The wedge face is the face of the platform adjacent and opposing a similar platform face of an adjacent blade. Further in some embodiments the deflector nose extends perpendicularly from the main body and radially into the cavity.

In some embodiments the deflector nose is arranged so that in use it blocks all direct flow paths for the incident stream of cooling fluid to the suction side. The incident stream (the direction of which is defined by the cooling fluid delivery system architecture and its interaction with the rotor) may therefore impinge on the deflector nose if it would otherwise have been directly incident on the suction side. The deflector nose may therefore be thought of as blocking all direct lines of sight to the suction side from the direction of incidence of the cooling fluid stream.

In some embodiments the deflector nose comprises a plate oriented so as to lie parallel to a wedge face of the blade with which the damper is in contact. The plate may also be oriented so as to lie in a plane that is substantially radially extending and substantially parallel to a main rotational axis of the rotor. Such a plate may be a convenient method of blocking all direct lines of sight for the incident stream of cooling fluid to the suction side. Indeed in some embodiments the deflector nose consists of a substantially radially extending plate. The plate may be sufficient to shield the suction side of the shank and additional nose features unnecessarily disrupt cooling fluid flow paths and cooling.

The incident stream of cooling fluid may travel at an angle to the plane described above as a consequence of rotation of the rotor. An axially travelling incident stream of cooling fluid may therefore be considered angled towards incidence on the suction side of the shank partially defining the cavity and away from incidence on the pressure side of the shank of the adjacent blade also partially defining the cavity. In this case the plate oriented as described may close a window that would otherwise permit direct incidence on an area of the suction surface by the stream. It should be further noted that because the smallest dimension of the panel is in the circumferential direction, unnecessary blocking of the stream of cooling fluid into the cavity may be minimised. For this reason the deflector nose may also be narrower than the main body of the damper, which may be optimised in terms of its dimensions for vibration damping.

In some embodiments the deflector nose is substantially equidistant the pressure and suction sides partially defining the cavity. The deflector nose may therefore be considered to extend radially through the circumferential centre of the cavity.

In some embodiments the main body of the damper is located adjacent one or more of the platforms and the nose extends radially inwards from the main body into the cavity.

In some embodiments the deflector nose extends for substantially at least 50% of the radial extent of the cavity. In other embodiments the nose extends for substantially at least 70% of the radial extent of the cavity. In other embodiments the nose extends for substantially the full radial extent of the cavity.

In some embodiments the axial extent of the deflector nose is the minimum necessary to deflect the stream of cooling fluid incident into the cavity away from the suction side of the shank partially defining the cavity. Giving rise to a bifurcation of the cavity in only an axially forward area may improve cooling fluid circulation around the cavity in an axially rearward area.

In some embodiments the damper is adapted to balance the impact of the deflector nose on the centre of gravity of the damper. The damper may for example further comprise a tail arranged to balance the deflector nose such that the centre of gravity of the damper is located as required for effective damping.

In some embodiments the cooling fluid delivery system comprises a bleed from a gas turbine engine compressor and ducting for delivery of bled fluid.

According to a second aspect of the invention there is provided a rotor in accordance with the first aspect. The rotor may in particular be a turbine rotor, but should not be construed to be limited to turbines.

According to a third aspect of the invention there is provided a damper in accordance with the first aspect of the invention.

The skilled person will appreciate that a feature described in relation to any one of the above aspects of the invention may be applied mutatis mutandis to any other aspect of the invention.

Embodiments of the invention will now be described by way of example only, with reference to the Figures, in which:

FIG. 1 is a sectional side view of a gas turbine engine;

FIG. 2 is a side view of part of a prior art turbine rotor;

Figure 3A:
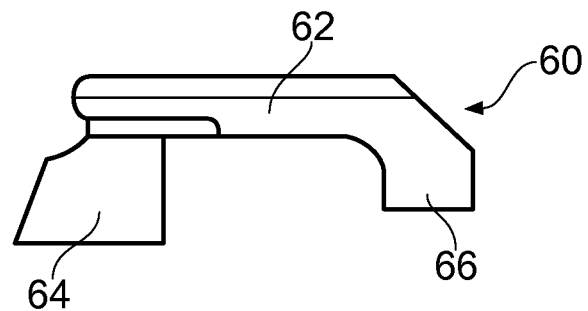
FIG. 3a is a side view of a damper in accordance with an embodiment of the invention.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Referring now to FIG. 2 an exemplary prior art portion of a turbine rotor is shown. A blade is generally provided at 30 and comprises a main portion 32 and a shank 34 radially inward of the main portion 32. The main portion 32 and shank 34 are separated by a platform 36. The blade 30 has a suction side (not shown) and a pressure side 38. The blade 30 extends radially outwards from a disc 40. Additional similar blades (not shown) are disposed circumferentially around and extending radially from the disc 40. The platform 36, in combination with the platforms of the additional blades, substantially seals a circumferential opening 42 in the inner wall 44 of a gas annulus 46.

Part of a fluid delivery system 48 including a pre-chamber 50 is also shown, providing a flow path to an interface between the platform 36 and the inner wall 44. The fluid delivery system 48 (again including the pre-chamber 50) also provides a flow path into a cavity 52. The cavity 52 is between the shank 34 of the pressure side 38 and the shank (not shown) of the suction side (not shown) of an adjacent blade (not shown). The cavity 52 is further defined by, and is radially inward of, the platform 36, and a similar platform (not shown) of the adjacent blade. As will be appreciated the pre-chamber 50 extends circumferentially, providing a fluid flow path to all cavities defined between adjacent blades around the rotor. Upstream of the pre-chamber 50, the fluid delivery system 48 comprises conduit and other channels (not shown) providing a fluid flow path to the pre-chamber 50 from a compressor bleed (not shown).

Seated adjacent and in contact with the platform is a vibration damper 54. The damper 54 is shielded from cooling fluid entering the cavity 52 by a lip 56 of the platform 36. Indeed in many embodiments the damper 54 is contained in a damper slot, formed in one or both adjacent platforms.

In use the fluid delivery system 48 provides cooling fluid to the cavity 52 and all similar cavities around the rotor. It also provides sealing fluid to the interface between the platform 36 and the inner wall 44, as well as to all similar interfaces around the rotor. In view of rotation of the rotor, an axially travelling stream of cooling fluid delivered via the pre-chamber 50 to the cavity 52 is incident upon a blade shank suction side partially defining the cavity 52. Where the stream impinges on the suction side it tends to cause corrosion and/or deposit build ups on the shank, reducing the efficiency with which the shank is cooled and reducing the life of the blade. The damper 54 meanwhile is a loose fit against the platform 36 and so tends to vibrate with any vibration of the blade 30, thereby causing friction and heating by which blade 30 vibration energy is dissipated. This blade vibration damping may be advantageous in preventing undesired aerodynamic effects and component wear.

Referring now to FIG. 3a a vibration damper according to the present invention is generally shown at 60. The damper 60 has a main body 62. The main body 62 has a substantially consistent cross-sectional shape. Extending from one end of the main body 62 is a deflector nose 64. The deflector nose 64 is in the form of a flat plate, substantially rectangular in shape and thinner than the main body 62. The deflector nose 64 is of consistent thickness (although in other embodiments it may be tapered towards side distal to the main body 62). Extending from the other end of the main body 62 is a tail 66. In combination the main body 62, deflector nose 64 and tail 66 give the damper 60 a 'C' shape when viewed from the side. The deflector nose 64 and tail 66 are arranged such that the centre of gravity of the main body 62 is substantially at its centre. This may be of assistance in mounting the damper 60 and in allowing it to vibrate as desired to damp blade vibration. Both the deflector nose 64 and tail 66 are integral with the main body 62.

Figure 3B:
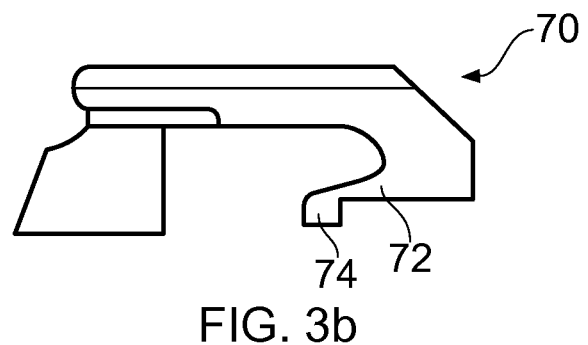
FIG. 3b is a side view of a damper in accordance with an embodiment of the invention.

Referring briefly to FIG. 3b an alternative vibration damper 70 according to an embodiment of the invention is shown. The vibration damper 70 is similar to the vibration damper 60, but a tail 72 of the vibration damper 70 is extended into a hook formation 74, which may assist in locating and securing the damper 70.

Figure 4:
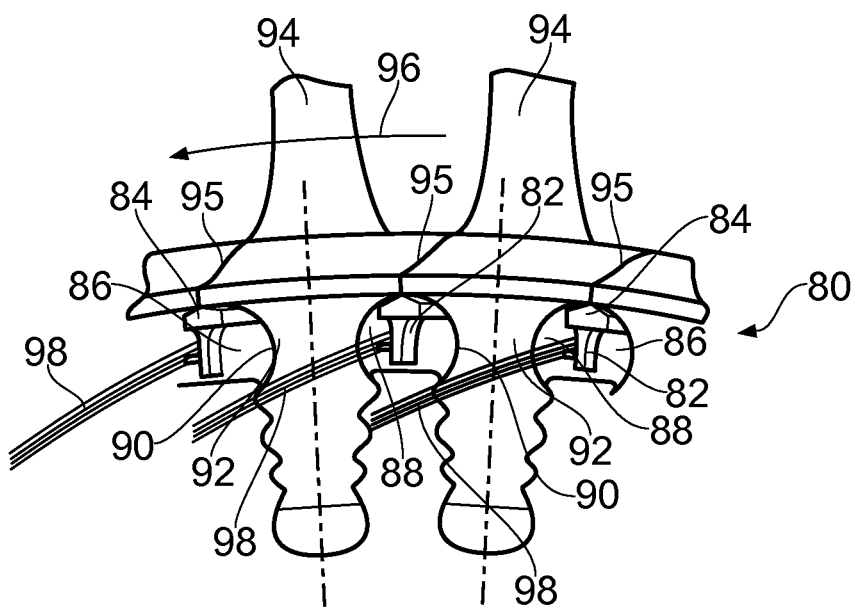
FIG. 4 is a front axially downstream view of part of a turbine rotor according to an embodiment of the invention.

Referring now to FIG. 4 a portion of a turbine rotor is generally shown at 80, the rotor being suitable for use in a gas turbine engine. The rotor 80 is similar to the rotor part of which was described with reference to FIG. 2. The damper 54 has however been replaced with a damper in accordance with the present invention (such as those 60, 70 shown in FIGS. 3A and 3B). Consequently deflector noses 82 of dampers 84 extend radially inwards into respective cavities 86. Each deflector nose 82 extends for substantially the full radial extent of its respective cavity 86. Each deflector nose 82 is substantially equidistant pressure 88 and suction 90 sides of the shanks 92 of adjacent blades 94 which partially define the corresponding cavity 86. Further the deflector noses 82 are in the form of a thin, flat plate oriented so as to lie parallel to wedge faces 95 of the adjacent platforms. Each deflector nose 82 is also oriented so as to lie in a respective plane that is substantially radially extending and substantially parallel to the main rotation axis of the rotor. Consequently the deflector noses 82 equally bifurcate axially forward areas of their respective cavities 84. Because however each deflector nose 82 is of sufficient axial length to extend for only a proportion of the axial extent of the damper 84, axially rear portions of each cavity 86 are not bifurcated.

In use, a fluid delivery system (not shown) provides cooling fluid to the cavities 86 via a pre-chamber (not shown). In view of rotation of the rotor 80 (indicated by rotation direction 96), an axially travelling stream of cooling fluid delivered via the pre-chamber is incident towards the suction sides 90 of the blade shanks 92 partially defining the cavities 86 (as indicated by stream lines 98). The streams of cooling fluid are however prevented from impinging directly on the suction sides 90 by the deflector noses 82. In view of the positioning and axial and radial extent of each deflector nose 82, each blocks all direct flow paths to the respective suction side 90 from the direction of incidence of the respective cooling fluid stream. Further because the axial extent of each deflector nose 82 is the minimum necessary to deflect the stream of cooling fluid incident into the respective cavity 86 away from the suction side 90, mixing and circulation of the cooling fluid is not further inhibited in an axially rearward area of the cavity 86.

Dampers 84 therefore perform a double function of reducing deposits and corrosion of the suction sides 90 of the shanks while continuing to perform as a vibration damper.

It will be understood that the invention is not limited to the embodiments above-described and various modifications and improvements can be made without departing from the various concepts described herein. By way of example the main body of the damper may be contained in a damper slot, formed in one or both adjacent platforms, optionally in the wedge faces, with the damper nose extending out of the damper slot and into the cavity. Except where mutually exclusive, any of the features may be employed separately or in combination with any other features and the invention extends to and includes all combinations and sub-combinations of one or more features described herein in any form of gas turbine engine.

The invention claimed is:

1. A gas turbine engine comprising:
   a rotor that comprises:
      a disc and a plurality of blades extending radially therefrom, each blade having a suction side and a pressure side and comprising a shank, a platform and a main portion, the main portion being radially outward of the shank and separated therefrom by the platform; and
      at least one cavity that is defined radially inward of the platforms and between a suction side of the shank of one blade and a pressure side of the shank of an adjacent blade; and
   a cooling fluid delivery system including a pre-chamber configured to deliver a stream of cooling fluid incident into the at least one cavity; and
   at least one damper comprising:
      a main body in contact with at least one blade; and
      a deflector nose extending from the main body into the cavity, the deflector nose having a surface that is parallel to a wedge face of the blade with which the damper is in contact; and
      wherein the deflector nose comprises a plate, and
      wherein the deflector nose of the at least one damper extends axially beyond the axial extent of the main body of the damper such that the plate is configured to deflect the stream of cooling fluid to prevent it from impinging directly on the suction side of the shank that partially defines the cavity, while not preventing further flow of cooling fluid within the cavity.

2. The gas turbine engine according to claim 1, wherein the longitudinal axis of the main body of the damper is parallel to a wedge face of the platform with which it is in contact.

3. The gas turbine engine according to claim 1, wherein the deflector nose is arranged so that in use it blocks all direct flow paths for the incident stream of cooling fluid to the suction side.

4. The gas turbine engine according to claim 1, wherein the deflector nose is substantially equidistant the pressure and suction sides partially defining the cavity.

5. The gas turbine engine according to claim 1, wherein the main body of the damper is located adjacent one or more of the platforms and the deflector nose extends radially inwards from the main body into the cavity.

6. The gas turbine engine according to claim 1, wherein the deflector nose extends for substantially the full radial extent of the cavity.

7. The gas turbine engine according to claim 1, wherein the axial extent of the deflector nose is the minimum necessary to deflect the stream of cooling fluid to prevent it from impinging directly on the shank that partially defines the cavity.

8. The gas turbine engine according to claim 1, wherein the damper is adapted to balance the impact of the deflector nose on the center of gravity of the damper.

9. The gas turbine engine according to claim 1, wherein the cooling fluid delivery system comprises a bleed from a gas turbine engine compressor and ducting for delivery of bled fluid.

* * * * *